Patented June 14, 1938

2,120,225

UNITED STATES PATENT OFFICE 2,120,225

NICOTINE COMPOSITION

Robert B. Arnold, Stonewall Courts, Va., assignor to Tobacco By-Products and Chemical Corporation, Louisville, Ky., a corporation of Delaware No Drawing. Application December 28, 1936, Serial No. 117,881

7 Claims. (Cl. 167—39)

This invention relates to a new composition of matter particularly suitable for the production of parasiticidal fumes containing nicotine or a similar insecticidal material having the general physical properties of nicotine as to sensitivity to oxidation, volatility, and a boiling point higher than that of water, but also having other uses as hereinafter explained.

The great advantages of nicotine fumes for the destruction of certain insects, particularly aphides, as compared with liquid sprays or dusts containing nicotine, have long been known, and it is a general practice to employ such fumes in treating plants growing in enclosed spaces, such as greenhouses, where it is practicable to subject such plants to a relatively long treatment, for the reason that insects may be killed by long-continued exposure to fumes relatively weak in nicotine, where they would not be materially affected by a short time exposure to such weak fumes.

In such closed spaces, the admission of outside air is so restricted that the enclosure may be considered as almost air-tight, whereby it is possible to build up gradually a sufficient body of fumes of a nicotine concentration which, though not high, will, in the relatively considerable time available, accomplish the desired insecticidal effects. Where a field crop, such, for example, as peas, is to be treated, it is a common practice to provide a canopy or apron, then move the same continuously over the field, and continuously blow dusts or sprays under it during its traveling movement over the field, the purpose being to bring such sprays or dusts into direct contact with the plants to cover the same, whereby the insecticide will to a large extent cling to and be held by the plants and therefore will continue its insecticidal action after the canopy or apron has left such plants and the latter are open to the free air.

Experiments have been made to destroy insects on plants growing in the open, by the application of fumes containing nicotine, suitable temporary enclosures, such as tents, or traveling canopies, or aprons, being employed for a brief period to hold the fumes in contact with the plants. In such attempts to treat plants growing in the open, commercial requirements make it necessary to move such temporary enclosures from one plant, or group of plants, to another plant or group of plants at a relatively rapid rate, as otherwise the time required for the treatment of a considerable area would be prohibitive.

These attempts to use nicotine fumes, in place of sprays or dusts, with such traveling canopies or aprons, have not resulted in practical success. Applicant has found that the principal reason for the lack of success is that it has not heretofore been possible to obtain within such temporary enclosures, fumes of sufficient nicotine concentration to make a commercially satisfactory percentage of kill of the insects within the short time the plants remain enclosed, and as, upon the removal of the temporary enclosure, the fumes are immediately diluted and dissipated by the free access of air, the insects affected by the fumes are revived by the fresh air reaching them. With such temporary enclosures, there is always an admission of some air, which dilutes the fumes admitted to the enclosed space, thereby enhancing the difficulties of obtaining a fumigating atmosphere, within the temporary enclosures, that will be sufficiently high in nicotine concentration to destroy the insects in the short time available before the temporary enclosure is removed.

Applicant has found that the essential reason for the inability to obtain a fumigating atmosphere of sufficiently high nicotine concentration within the enclosure is that the fumes as generated are of necessity of too low a nicotine concentration, and this because the composition of matter itself from which the fumes are evolved is not such as could produce fumes of high nicotine concentration, and hence, as before stated, when these fumes are admitted beneath the temporary enclosure, and diluted by the air enclosed in and leaking into the temporary enclosure they give a resultant mixture too low in nicotine concentration to accomplish any rapid killing action, and, not being long enough in contact with the plants then under the enclosure to give the long continued action which is required to eventually kill the insects, the final result is failure.

One object of applicant's invention is to provide a composition of matter which will endure being heated to a temperature above the boiling point of nicotine, 478° F., to evolve a fume containing a very high proportion of nicotine gas, as distinguished from a mere vapor, without the great danger of oxidation of the nicotine which ordinarily occurs when subjecting nicotine to such a temperature.

A further object of the invention, in its best embodiment, is to provide a composition of matter which will give the type of fume above referred to in a readily visible form, whereby the operator may easily detect wind effects, apron leakage and the extent to which the fumes spread, whereby he can more easily regulate and control the conditions of fumigation.

With these general objects in view, and some others which will appear from the description hereinafter, the invention consists in a composition of matter comprising a relatively large proportion of anhydrous nicotine and a small proportion of a liquid petroleum hydrocarbon of a particular type, as more fully described hereinafter.

Applicant has discovered that anhydrous nicotine, when combined with a water-free liquid petroleum hydrocarbon acts in a manner quite different from the way in which a combination of nicotine with such a hydrocarbon and water, will act, even where the water is present in a relatively small proportion. Applicant found that the presence of even a little water with the nicotine and a petroleum hydrocarbon such as above-mentioned will cause a cloudy mixture to be formed, which on standing will separate into two layers, whereas water-free liquid petroleum hydrocarbon fractions having a distillation range falling between about 400° F. and about 700° F. and even higher, are miscible in all proportions with anhydrous nicotine to form a clear solution which is stable, that is, has no tendency to separate into layers, even on long standing.

In carrying out the invention it is necessary to provide as nearly an anhydrous nicotine as can be obtained in commercial practice. Since the usual commercial nicotine always contains a small amount of impurities, such as resinous, or tarry matters, as well as water, the anhydrous nicotine produced therefrom will contain only from 94% to 99% nicotine, the remainder being resins or similar impurities. In regular practice a substantially anhydrous nicotine containing less than 1% water, may be produced by vacuum distillation of the usual commercial nicotine, which contains about 50% nicotine and from 46% to 49% water. It is feasible by such vacuum distillation to obtain regularly a substantially anhydrous product with as low as 0.35% to 0.45% water without resort to chemical treatment. Such a nicotine preparation containing less than 1% water, and with from 1% to 6% of impurities other than water, such as resins and the like, is a material which will be particularly satisfactory for the purpose of this invention and is included under the term anhydrous nicotine, wherever employed in the specification and claims, because with such a low percentage of water, the difference in its action and the amount of oxidation of the nicotine due to the presence of water is so small as to be negligible. A truly anhydrous nicotine containing no water whatever may be made by chemical treatment, if desired, but the cost is thereby increased and the difference in results between the chemically prepared material and that obtained by careful vacuum distillation is too small to justify the additional expense, except in laboratory work.

The particular liquid petroleum to be mixed with the anhydrous nicotine must, of course, be free from water, and such material may be obtained in the market under specifications demanding freedom from water. So far as this invention is concerned, an important requirement for a fumigant is that the anhydrous nicotine be combined with a liquid petroleum hydrocarbon containing constituent fractions whose boiling points fall within a distillation range commencing not materially below 400° F. and extending to about 478° F., the boiling point of anhydrous nicotine. The purpose of these fractions is to form a protective atmosphere for the nicotine as it approaches its boiling point and thereafter as it is gasified. A mixture such as just described is eminently satisfactory for the production of the insecticidal fumes so far as insecticidal properties are concerned. However, these fumes are not visible, or at least not particularly so, as they leave the fume-generating apparatus, and they are not persistent. Hence, in the best embodiment of the invention, as applied to fumigants, in order to provide a readily visible and persistent fume, the mixture contains, in addition to the low boiling fractions, some liquid petroleum fractions whose respective boiling points are above that of nicotine, and at least a part should have a boiling point higher than the highest temperature to which the composition of matter is to be heated. In practice it is sufficient to heat the said composition to a temperature of about 500° to 550° F. and therefore the fractions of petroleum which are relied on to evolve easily visible fumes may be such as have a distillation range from about 500° F. to 700° F. and even up to 800° F. in order to insure the presence of some fraction which will pass off as a smoke as distinguished from a gas or vapor, because, in the smoke form, minute particles or drops of liquid exist and thereby color and render visible the fumes.

Where a liquid hydrocarbon product may be obtained having a mixture of hydrocarbons whose distillation range is from 400° F. to 700° F. this may be used to give the results. However, where such a product cannot be obtained, with the constituent fractions in the desired proportions, it is advisable to combine or blend some of the standard products on the market, some examples being given hereinafter, such a blend furnishing the two classes of liquid hydrocarbons desired, namely, that class which serves to form a protective atmosphere for the nicotine in advance of, as well as after, the gasification of the nicotine, and that class of higher boiling fractions particularly intended to color and make visible the fumes as discharged from the generator. Of course, the latter class also aids in protecting the nicotine by assisting in the exclusion of air. When a heavy smoke is desired a small amount of water-free liquid hydrocarbon product whose distillation range is largely above 700° F. may be included. Sudden vaporization of the relatively large proportion of nicotine and lower boiling hydrocarbons causes the high boiling fractions to break up into a smoke.

A further essential of the composition is that the nicotine must be in large proportion relative to the hydrocarbons so that the fumes generated are so high in nicotine that when diluted by the air contained beneath and leaking into the temporary enclosure, the resultant mixture will still be so high in nicotine content that it will have a rapid insecticidal action on the insects, and thus can be relied on to have a high lethal effect before the removal of the temporary enclosure allows free access of fresh air to the insects. Of course, there may be some condensation of hydrocarbon fumes on the insects and plants, and this will hold nicotine in solution and prolong the lethal action, but it is not counted on because of the relatively small proportion of hydrocarbon in the composition and in the diluted fumes. Too much deposit of petroleum on the plants is injurious to them.

As stated before, the anhydrous nicotine, on account of the presence of resinous and other non-aqueous impurities contains from 94% to 99% nicotine. The total amount of liquid petroleums added is such as to bring the nicotine content of the mixture to a certain standard proportion. In practice it has been found that a mixture of anhydrous nicotine and water-free liquid petroleum hydrocarbons containing 75% to 80% nicotine is entirely satisfactory for use with temporary enclosures such as ordinarily used, the resultant fumigating atmosphere within the enclosure having under ordinary working conditions, a nicotine strength of about 2.5 to 5 lbs. of nicotine per 100,000 cubic feet of space inside the temporary enclosure, which gives a satisfactory kill of susceptible insects in about 30 seconds. This is a nicotine concentration of about 5 to 10 times that heretofore employed. It will be understood that the volume of discharge of fumes per unit of time is related to the cubic contents of the temporary enclosure and the length of time the plants are enclosed so as to give the high concentration stated.

Among the various hydrocarbon compounds which will be satisfactory in carrying out the invention, are kerosene, mineral seal oil and the very lightest lubricating oils.

The most advantageous composition of matter embodying the best form of the invention for producing high visibility is made by mixing together thoroughly the following ingredients in the proportions stated, namely:

| | Pounds |
|---|---|
| Anhydrous nicotine containing 98% nicotine | 82 |
| Mineral seal oil, 500° F.–700° F. | 16 |
| Light lubricating oil, 700° F. and above | 2 |

Another very satisfactory formula is as follows:

| | Pounds |
|---|---|
| Anhydrous nicotine containing 98% nicotine | 82 |
| Kerosene, 350° F.–500° F. | 13 |
| Light lubricating oil, 700° F. and above | 5 |

Formulas giving lower visibility are as follows:

| | Pounds |
|---|---|
| Anhydrous nicotine containing 98% nicotine | 82 |
| Mineral seal oil | 18 | and

| | Pounds |
|---|---|
| Anhydrous nicotine containing 98% nicotine | 82 |
| Mineral seal oil | 9 |
| Kerosene | 9 |

In making the mixture it is advantageous to put the hydrocarbon materials into a mixer, mix them thoroughly and then supply the anhydrous nicotine gradually while maintaining the agitation. It also is an advantage to work at a low room temperature, to avoid volatilization of the nicotine, and, of course, the mixing should be done in a closed apparatus.

Attention is called to two important advantages of applicant's composition when handled in large scale production and use, namely, 1st, it has no corrosive action on metal parts, probably due largely to the absence of water and the presence of the liquid hydrocarbons, and 2nd, when handled by pumps it is a sufficient lubricant because of the presence of the hydrocarbons. For this reason the composition of matter consisting of anhydrous nicotine and water-free liquid petroleum hydrocarbon in small proportion relative to the nicotine, becomes a highly satisfactory means of storing and shipping nicotine, even where the composition is to be used, not as a fumigating material, but in aqueous sprays, because, although as soon as put in water all the advantages of the anhydrous material are lost, the benefits have been obtained in the keeping properties of the nicotine up to the time of using and also in the lack of corrosive action on storage tanks and shipping containers of metal, such as cans. As this protective action on the nicotine and metallic containers may be obtained with a small percentage of liquid petroleum hydrocarbon, for example, as low as 3 percent, there is no danger of injury to plants treated with a spray of the usual nicotine strength, when made from such a composition, because the proportion of the liquid hydrocarbon in such a spray is so small as to be practically negligible.

In general practice the proportion of high boiling fractions in the liquid petroleum hydrocarbons employed is less than that of the low boiling fractions, and this will be an advantage, because a relatively small proportion of those fractions whose distillation range is above 600° F. will suffice to color and make visible the fumes. In most cases the low boiling fractions are, in the final composition, present to the extent of about two to five times the high boiling fractions.

A still further important advantage of the composition comprising anhydrous nicotine and water-free liquid petroleum hydrocarbon as a fumigant is that the latent heat of vaporization of the liquid hydrocarbon is relatively low. This makes it possible to heat the nicotine above its boiling point with a limited heat supply, which is a great advantage with a portable fumigating apparatus and furthermore makes water-free liquid hydrocarbon a most advantageous diluent to adjust the nicotine strength of a fumigating composition.

What is claimed is:

1. A composition of matter in liquid form comprising anhydrous nicotine and water-free liquid petroleum hydrocarbon in solution in each other, said hydrocarbon having a boiling point not substantially less than 400° F. and not substantially greater than 800° F. the nicotine constituting not less than about seventy-five to eighty percent of the nicotine and hydrocarbon mixture.

2. A composition of matter comprising anhydrous nicotine and a water-free liquid petroleum hydrocarbon having a boiling point less than 478° F. and above 400° F. the nicotine being present in greater proportion than the hydrocarbon.

3. A composition of matter comprising anhydrous nicotine and a water-free liquid petroleum containing fractions whose distillation range is from about 400° F. to 478° F. the nicotine being present in greater proportion than the hydrocarbon.

4. A composition of matter comprising anhydrous nicotine and a water-free liquid petroleum containing fractions whose distillation range is from about 400° F. to 700° F. and also containing fractions whose distillation range is from 700° F. to about 800° F., the proportion of the high boiling fractions being less than that of the low boiling fractions, and the nicotine being present in greater proportion than the hydrocarbon.

5. A parasiticidal fumigating composition comprising nicotine containing less than one percent of water, and a mixture of water-free liquid petroleum hydrocarbons containing fractions whose distillation range extends from about 400° F. to about 700° F., the nicotine being the principal ingredient of the composition of matter.

6. A parasiticidal fumigating composition comprising nicotine containing less than one percent of water, and a mixture of water-free liquid petroleum hydrocarbons containing fractions whose distillation range extends from about 400° F. to about 700° F., and also containing fractions whose boiling points are above 700° F. and not above about 800° F., the nicotine being the principal ingredient of the composition of matter.

7. A parasiticidal fumigating composition comprising 82 parts of anhydrous nicotine of 98% nicotine strength, 2 to 5 parts of light lubricating oil, and from 13 to 16 parts of a hydrocarbon selected from the group; kerosene, mineral seal oil.

ROBERT B. ARNOLD.